United States Patent
Mayall et al.

(10) Patent No.: US 7,544,236 B2
(45) Date of Patent: Jun. 9, 2009

(54) PHTHALOCYANINE COMPOUNDS AND THEIR USE IN INK-JET PRINTING

(75) Inventors: John Mayall, Manchester (GB); Prakash Patel, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 98 days.

(21) Appl. No.: 11/666,944

(22) PCT Filed: Oct. 21, 2005

(86) PCT No.: PCT/GB2005/004054

§ 371 (c)(1), (2), (4) Date: Apr. 30, 2007

(87) PCT Pub. No.: WO2006/051258

PCT Pub. Date: May 18, 2006

(65) Prior Publication Data

US 2008/0110369 A1 May 15, 2008

(30) Foreign Application Priority Data

Nov. 11, 2004 (GB) .................. 0425015.5

(51) Int. Cl.
C09D 11/02 (2006.01)
C09B 47/04 (2006.01)
B41J 2/01 (2006.01)

(52) U.S. Cl. .............. 106/31.49; 106/31.78; 540/132; 540/133; 347/100

(58) Field of Classification Search .............. 106/31.49, 106/31.78; 540/132, 133; 347/100
See application file for complete search history.

(56) References Cited

U.S. PATENT DOCUMENTS

| | | | | |
|---|---|---|---|---|
| 2,414,374 | A | 1/1947 | Haddock et al. | 260/314.5 |
| 4,632,703 | A * | 12/1986 | Koike et al. | 106/31.46 |
| 5,123,960 | A * | 6/1992 | Shirota et al. | 106/31.46 |
| 5,704,969 | A * | 1/1998 | Kanaya et al. | 106/31.48 |
| 7,087,107 | B2 | 8/2006 | Tateishi et al. | 106/31.49 |
| 7,156,908 | B2 * | 1/2007 | Patel | 106/31.49 |
| 7,211,134 | B2 | 5/2007 | Tateishi et al. | 106/31.49 |
| 7,219,988 | B2 | 5/2007 | Hanaki et al. | 347/100 |
| 7,293,867 | B2 * | 11/2007 | Ogawa et al. | 106/31.27 |
| 2004/0099181 | A1 | 5/2004 | Tateishi et al. | 106/31.47 |
| 2005/0076807 | A1 | 4/2005 | Ogawa et al. | 106/31.49 |
| 2005/0081745 | A1 | 4/2005 | Ogawa et al. | 106/31.27 |
| 2006/0092248 | A1 | 5/2006 | Taguchi et al. | 347/100 |

FOREIGN PATENT DOCUMENTS

| | | |
|---|---|---|
| EP | 0 719 847 | 7/1996 |
| EP | 1 350 819 | 10/2003 |
| EP | 1 364 994 | 11/2003 |
| EP | 1 469 047 | 10/2004 |
| JP | 2003 309118 | 10/2002 |
| JP | 2003 176429 | 6/2003 |

* cited by examiner

*Primary Examiner*—Helene Klemanski
(74) *Attorney, Agent, or Firm*—Morgan Lewis Bockius LLP

(57) ABSTRACT

A compound of Formula (1) in the free acid or salt form:

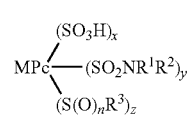

Formula (1)

wherein:
M is 2H, Si, a metal, an oxymetal group, a hydroxymetal group or a halometal group;
Pc represents a phthalocyanine nucleus of formula;

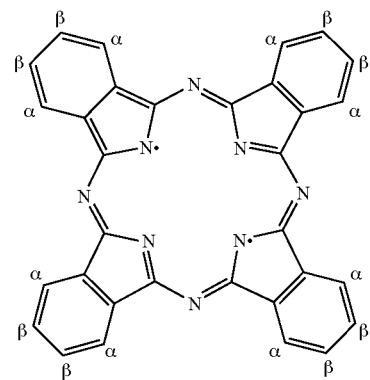

each $R^1$ and $R^2$ independently is H, optionally substituted alkyl or optionally substituted aryl;
each $R^3$ independently is optionally substituted alkyl or optionally substituted aryl;
each n independently is 1 or 2;
x is 0 to 2;
y is 0.1 to 2.5;
x is 0.1 to 2.5; and
the sum (x+y+z) is 2.2 to 4. Also compositions, ink jet printer inks, cartridges and processes and printed materials.

13 Claims, No Drawings

PHTHALOCYANINE COMPOUNDS AND THEIR USE IN INK-JET PRINTING

This invention relates to phthalocyanine compounds, compositions and inks, to printing processes, to printed substrates and to ink-jet printer cartridges.

Ink-jet printing is a non-impact printing technique in which droplets of ink are ejected through a fine nozzle onto a substrate without bringing the nozzle into contact with the substrate. The set of inks used in this technique typically comprise yellow, magenta, cyan and black inks.

With the advent of high-resolution digital cameras and ink-jet printers it is becoming increasingly common for consumers to print off photographs using an ink-jet printer. This avoids the expense and inconvenience of conventional silver halide photography and provides a print quickly and conveniently.

While ink-jet printers have many advantages over other forms of printing and image development there are still technical challenges to be addressed. For example, there are the contradictory requirements of providing ink colorants that are soluble in the ink medium and yet do not run or smudge excessively when printed on paper. The inks need to dry quickly to avoid sheets sticking together after they have been printed, but they should not form a crust over the tiny nozzle used in the printer. Storage stability is also important to avoid particle formation that could block the tiny nozzles used in the printer especially since consumers can keep an ink-jet ink cartridge for several months. Furthermore, the resultant images desirably do not fade rapidly on exposure to light or common oxidising gases such as ozone.

According to the present invention there is provided a compound of Formula (1) in the free acid or salt form:

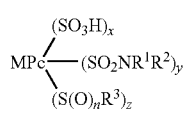

Formula (1)

wherein:
M is 2H, Si, a metal, an oxymetal group, a hydroxymetal group or a halometal group;
Pc represents a phthalocyanine nucleus of formula;

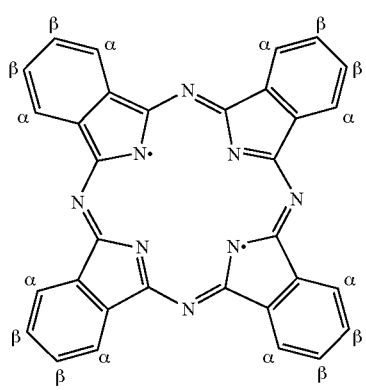

each $R^1$ and $R^2$ independently is H, optionally substituted alkyl or optionally substituted aryl;
each $R^3$ independently is optionally substituted alkyl or optionally substituted aryl;
each n independently is 1 or 2;
x is 0 to 2;
y is 0.1 to 2.5;
x is 0.1 to 2.5; and
the sum (x+y+z) is 2.2 to 4.

M is preferably 2Li, 2Na, 2K, Mg, Ca, Ba, Al, Si, Sn, Pb, Rh, Sc, Ti, V, Cr, Mn, Fe, Co, Ni, Cu, Zn, AlX, GaX, InX or $SiX_2$, where in X is OH or Cl, more preferably Sc, Ti, Va, Cr, Mn, Fe, Co, Zn, Ni and Cu, especially copper or nickel, especially copper.

When $R^1$, $R^2$ or $R^3$ is optionally substituted alkyl, it is preferably optionally substituted $C_{1-4}$-alkyl.

When $R^1$, $R^2$ or $R^3$ is optionally substituted aryl, it is preferably optionally substituted phenyl or optionally substituted naphthyl, more preferably optionally substituted phenyl.

Preferably x is 0.5 to 2, especially 0.6 to 1.4.
Preferably y is 0.5 to 2, more preferably 0.6 to 1.5.
Preferably z is 0.5 to 2, more preferably 0.6 to 1.5.
Preferably the sum (x+y+z) is from 3 to 4, more preferably 4.

As is generally the case with phthalocyanine synthesis, the resultant compound is a mixture and the values for x, y and z are average values.

The substituents represented by each of $-(SO_2NR^1R^2)_y$ and $-(S(O)_nR^3)_z$ may be a single group or a mixture of 2 or more different groups of those general formulae. For example $-(S(O)_nR^3)_z$ could represent two different groups such as $-(SO_2C_6H_5SO_3H)_1$ and $-(SOC_6H_5CO_2H)_1$.

In a further preferred embodiment the substituents represented by $-(SO_3H)_x$, $-(SO_2NR^1R^2)_y$ and $-(S(O)_nR^3)_z$ are each attached to the phthalocyanine ring through β-positions, preferably each on a different benzene ring of the phthalocyanine ring.

The preferred optional substituents which may be present on $R^1$, $R^2$ and $R^3$ are each independently selected from: optionally substituted alkoxy (preferably $C_{1-4}$-alkoxy), optionally substituted aryl (preferably phenyl), optionally substituted aryloxy (preferably phenoxy), optionally substituted heterocyclic, polyalkylene oxide (preferably polyethylene oxide or polypropylene oxide), carboxy, phosphonic, phosphato, sulpho, nitro, cyano, halo, ureido, $-SO_2F$, hydroxy, ester, $-NR^aR^b$, $-COR^a$, $-CONR^aR^b$, $-NHCOR^a$, carboxyester, sulphone, and $-SO_2NR^aR^b$, wherein $R^a$ and $R^b$ are each independently H or optionally substituted alkyl (especially $C_{1-4}$-alkyl).

The compounds of Formula (1) are also preferably free from fibre reactive groups. The term fibre reactive group is well known in the art and is described for example in EP 0356014 A1. Fibre reactive groups are capable, under suitable conditions, of reacting with the hydroxyl groups present in cellulosic fibres or with the amino groups present in natural fibres to form a covalent linkage between the fibre and the dye.

Acid or basic groups on the compounds of Formula (1), particularly acid groups, are preferably in the form of a salt. Thus, the Formulae shown herein include the compounds in salt form.

Preferred salts are alkali metal salts, especially lithium, sodium and potassium, ammonium and substituted ammonium salts (including quaternary amines such as $((CH_3)_4N^+)$ and mixtures thereof. Especially preferred are salts with sodium, lithium, ammonia and volatile amines, more especially sodium salts. Compounds of Formula (1) may be converted into a salt using known techniques.

The compounds of Formula (1) may exist in tautomeric forms other than those shown in this specification. These tautomers are included within the scope of the present invention.

The compounds of Formula (1) may be prepared by any method known in the art, and particularly by cyclisation of appropriate substituted phthalic acid, phthalonitrile, iminoisoindoline, phthalic anhydride, phthalimide or phthalamide in the presence of a suitable source of ammonia (if required), and (if required) a suitable metal salt, for example $CuCl_2$, and a base such as 1,8-diazabicyclo[5.4.0]undec-7-ene (DBU). Thus preferred compounds of Formula (1) substituted only in the β-position may be prepared by condensing a compound of Formula (2):

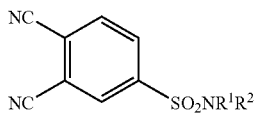

Formula (2)

with a compound of Formula (3):

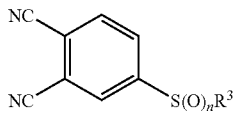

Formula (3)

wherein $R^1$, $R^2$, $R^3$ and n are as hereinbefore defined, and optionally 3,4 dicyano benzene sulfonic acid, under the conditions as defined above.

The compounds of Formula (1) have attractive, strong shades and are valuable colorants for use in the preparation of ink-jet printing inks. They benefit from a good balance of solubility, storage stability and fastness to water, light and ozone.

According to a second aspect of the present invention there is provided a composition comprising a compound of Formula (1) as described in the first aspect of the invention and a liquid medium.

Preferred compositions according to the second aspect of the invention comprise:
 (a) from 0.01 to 30 parts of a compound of Formula (1) according to the first aspect of the invention; and
 (b) from 70 to 99.99 parts of a liquid medium;

wherein all parts are by weight

Preferably the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

Preferably component (a) is completely dissolved in component (b). Preferably component (a) has a solubility in component (b) at 20° C. of at least 10%. This allows the preparation of liquid dye concentrates that may be used to prepare more dilute inks and reduces the chance of the dye precipitating if evaporation of the liquid medium occurs during storage.

The compositions may be incorporated in an ink-jet printer as a high concentration cyan ink, a low concentration cyan ink or both a high concentration and a low concentration ink. In the latter case this can lead to improvements in the resolution and quality of printed images. Thus the present invention also provides a composition (preferably an ink) where component (a) is present in an amount of 2.5 to 7 parts, more preferably 2.5 to 5 parts (a high concentration ink) or component (a) is present in an amount of 0.5 to 2.4 parts, more preferably 0.5 to 1.5 parts (a low concentration ink), wherein all parts are by weight.

Preferred liquid media include water, a mixture of water and organic solvent and organic solvent free from water. Preferably the liquid medium comprises a mixture of water and organic solvent or organic solvent free from water.

When the liquid medium (b) comprises a mixture of water and organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide and sulfolane. Preferably the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable liquid media comprising a mixture of water and one or more organic solvents are described in U.S. Pat. Nos. 4,963,189, 4,703,113, 4,626,284 and EP-A-425,150.

When the liquid medium comprises organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore-described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the mixture of phthalocyanine dyes in the liquid medium. Examples of polar solvents include $C_{1-4}$-alcohols.

In view of the foregoing preferences it is especially preferred that where the liquid medium is organic solvent free from water it comprises a ketone (especially methyl ethyl ketone) and/or an alcohol (especially a $C_{1-4}$-alkanol, more especially ethanol or propanol).

The organic solvent free from water may be a single organic solvent or a mixture of two or more organic solvents. It is preferred that when the liquid medium is organic solvent free from water it is a mixture of 2 to 5 different organic solvents. This allows a liquid medium to be selected that gives good control over the drying characteristics and storage stability of the ink.

Liquid media comprising organic solvent free from water are particularly useful where fast drying times are required and particularly when printing onto hydrophobic and non-absorbent substrates, for example plastics, metal and glass.

The liquid media may of course contain additional components conventionally used in ink-jet printing inks, for example viscosity and surface tension modifiers, corrosion inhibitors, biocides, kogation reducing additives and surfactants which may be ionic or non-ionic.

Although not usually necessary, further colorants may be added to the composition to modify the shade and performance properties. Examples of such colorants include C.I. Direct Yellow 86, 132, 142 and 173; C.I. Direct Blue 307; C.I. Food Black 2; C.I. Direct Black 168 and 195; and C.I. Acid Yellow 23.

It is preferred that the composition according to the invention is ink suitable for use in an ink-jet printer. Inks suitable for use in an ink-jet printer are inks that are able to repeatedly fire through an ink-jet printing head without causing blockage of the fine nozzles.

Inks suitable for use in an ink-jet printer preferably have a viscosity of less than 20 cP, more preferably less than 10 cP, especially less than 5 cP, at 25° C.

Inks suitable for use as ink-jet printer ink preferably contains less than 500 ppm, more preferably less than 250 ppm, especially less than 100 ppm, more especially less than 10 ppm in total of divalent and trivalent metal ions (other than any divalent and trivalent metal ions bound to a colorant of Formula (1) or any other colourant or additive incorporated in the ink).

Preferably the ink has been filtered through a filter having a mean pore size below 10 μm, more preferably below 3 μm, especially below 2 μm, more especially below 1 μm. This filtration removes particulate matter that could otherwise block the fine nozzles found in many ink-jet printers.

Preferably the ink contains less than 500 ppm, more preferably less than 250 ppm, especially less than 100 ppm, more especially less than 10 ppm in total of halide ions.

A third aspect of the invention provides a process for forming an image on a substrate comprising applying an ink according to the second aspect of the invention thereto by means of an ink-jet printer.

The ink-jet printer preferably applies the ink to the substrate in the form of droplets that are ejected through a small orifice onto the substrate. Preferred ink-jet printers are piezoelectric ink-jet printers and thermal ink-jet printers. In thermal ink-jet printers, programmed pulses of heat are applied to an ink in a reservoir by means of a resistor adjacent to the orifice, thereby causing the ink to be ejected from the orifice in the form of small droplets directed towards the substrate during relative movement between the substrate and the orifice. In piezoelectric ink-jet printers the oscillation of a small crystal causes ejection of the ink from the orifice. Alternately the ink can be ejected by an electromechanical actuator connected to a moveable paddle or plunger, for example as described in International Patent Application WO00/48938 and International Patent Application WO00/55089.

The substrate is preferably paper, plastic, a textile, metal or glass, more preferably paper, an overhead projector slide or a textile material, especially paper.

Preferred papers are plain or treated papers which may have an acid, alkaline or neutral character. Glossy papers are especially preferred.

A fourth aspect of the present invention provides a printed substrate, preferably paper, plastic, a textile, metal or glass, more preferably paper, an overhead projector slide or a textile material, especially paper more especially plain, coated or treated paper printed with a compound as described in the first aspect of the invention, a composition according to the second aspect of the invention or by means of a process according to the third aspect of the invention.

It is especially preferred that the printed material of the fourth aspect of the invention is a photograph printed using a process according to the third aspect of the invention.

A fifth aspect of the present invention provides an ink-jet printer cartridge comprising a chamber and an ink composition according to the second aspect of the present invention present in said chamber.

The invention is further illustrated by the following Examples in which all parts and percentages are by weight unless otherwise stated.

EXAMPLE 1

Preparation of a compound which, in the free acid form, is of Formula (4):

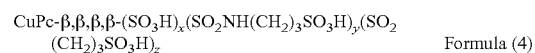

Formula (4)

wherein x is 1, y is 1 and z is 2.

Step 1—Preparation of:

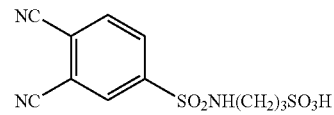

A solution of 3,4-dicyanobenzenesulphonyl chloride (4.2 g, 0.018 mol, prepared by the method of Negrimovsky et al. *Phosphorus, Sulfur, and Silicon* 1995, 104, 161-167) in anhydrous acetone (20 ml) was added dropwise to a solution of 3-amino-1-propanesulphonic acid (5 g, 0.036 mol) in water (25 ml) at pH 9.5 (sat. aq. $Na_2CO_3$) at 15° C. (water bath). After completion of the addition the reaction mixture was heated under reflux for 10 min and allowed to cool down to room temperature. The solvent was removed under reduced pressure and a small amount of acetone/water (98:1) was added. The material was passed through a short pad of silica gel and the solvent was removed under reduced pressure. The resulting solid was crystallised from acetonitrile and hot filtered. The product was dried under vacuum over $P_2O_5$. Yield 3.8 g.

Step 2—Preparation of:

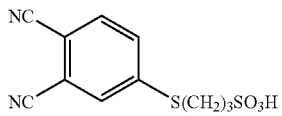

DMSO (100 ml) was stirred at room temperature and potassium carbonate (0.171 mol) was added. 4-Nitrophthalonitrile (0.171 mol) was added portionwise over 10 min and the reaction mixture became red. 3-Mercaptopropanesulphonic acid (0.182 mol) was then added portionwise, maintaining the reaction mixture at room temperature. The reaction mixture turned yellow on addition of the thiol. On completion of the addition the mixture was stirred at room temperature for 2 h. TLC showed the reaction to be complete. The reaction mixture was filtered to remove any insoluble material. The filtrate was then added dropwise, with stirring, to ethyl acetate (2 L). The mixture was stirred for 1 h and the resulting precipitate was filtered off and washed with ethyl acetate.

Step 3—Preparation of:

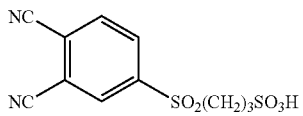

The substituted phthalonitrile (0.107 mol) from step 2 was added slowly portionwise with stirring to acetic acid (250 ml) to give an orange solution. Tungstic acid (0.00555 mol) was then added and the reaction temperature was lowered to about 10° C. (water/ice bath). Hydrogen peroxide (25 ml (35% solution)) was then added dropwise to the reaction mixture, maintaining the temperature below 15° C. The reaction mixture was stirred for 2 h with the temperature maintained below 30° C. The reaction mixture was them heated at 60° C. for 2 h and allowed to cool down to room temperature. The reaction mixture was added dropwise to stirred ethyl acetate (1.5 L). The mixture was stirred for 1 h and the resulting precipitate was filtered off solid, washed with ethyl acetate and dried. The solid was slurried in ethanol (350 ml) and stirred for 1 h at 60° C. The mixture was filtered hot and the solid dried at the pump. The ethanol wash was repeated three times and the solid was then dried.

Step 4—Preparation of the Title Compound

A mixture of the compounds from step 1 (2.2 g, 7.4 mmol), step 3 (5.65 g, 14.8 mmol) and 3,4-dicyano benzene sulphonic acid (1.85 g, 7.4 mmol), anhydrous copper (II) chloride (0.99 g, 7.4 mmol), urea (6 g, 0.1 mol), 1,8-diazabicyclo [5.4.0]undec-7-ene (0.38 g, 0.0025 mol) and ammonium molybdate (0.1 g) was heated at 180° C. under nitrogen for 3 h. The reaction mixture was allowed to cool down to room temperature and water (100 mL) was added. The volume of the solution was reduced to 40 mL and the product was precipitated by the dropwise addition of acetone. The solid was filtered off and washed with acetone. The solid was finely ground, triturated with hot ethanol and filtered off. The solid was dissolved in water at pH 10 (2M LiOH) and the solution heated to 50° C. and the product precipitated by the dropwise addition of propan-2-ol and filtered off. Solid redissolved in water (50 ml) at pH 10 (LiOH) and precipitated with propan-2-ol and filtered off. Solid washed with propan-2-ol, dissolved in water (100 ml) dialysed (<100 micro cm$^{-1}$). The solution was filtered (0.45 micron pore size nylon) and dried at 50° C. to give the title compound (7.15 g).

EXAMPLES 2 AND 3

Example 1 may be repeated except that the relative ratios of the compounds from steps 1 and 3 and 4,5-dicyano benzene sulphonic acid are adjusted as shown below to give a compound which, in the free acid form, is of Formula (4) shown above wherein x, y and z are as described in the table below:

| Example | Weight of Compound from Example 1, step 1 | Weight of Compound from Example 1, step 3 | Weight of 3,4-dicyano benzene sulphonic acid | Value of x, y and z in resultant Dye of Formula 2 |
|---|---|---|---|---|
| 2 | 2.2 g | 2.83 g | 3.7 g | x = 2, y = 1, z = 1 |
| 3 | 4.4 g | 2.83 g | 1.85 g | x = 1, y = 2, z = 1 |

Comparative Dye 1

Comparative Dye 1 is C.I. Direct Blue 199 obtained as Pro-Jet™ Cyan 1 from Avecia Inkjet Ltd, as supplied this is of Formula:

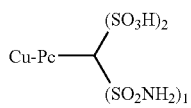

Comparative Dye 2

Comparative Dye 2 is Pro-Jet™ Cyan 2 from Avecia Inkjet Ltd.

EXAMPLE 4

Preparation of Inks

Inks were prepared from the dyes of Examples 1, 2 and 3 and the Comparative Dyes 1 and 2 by dissolving 3 g of the dye in 97 ml of a liquid medium consisting of 5 parts 2-pyrrolidone; 5 parts thiodiethylene glycol; 1 part Surfynol™ 465 and 89 parts water and adjusting the pH to between pH 8 to 9 with sodium hydroxide. Surfynol™ 465 is a surfactant from Air Products. Inks such as this have a viscosity of less than 20 cP at 25° C.; less than 500 ppm in total of divalent and trivalent metal ions (other than any divalent and trivalent metal ions bound to a colorant of Formula (1) or any other component of the ink); and less than 500 ppm in total of halide ions.

Ink-Jet Printing

Inks, prepared as described above, were filtered through a 0.45 micron nylon filter and then incorporated into empty print cartridges using a syringe.

These inks were then printed onto Xerox 4024 Premium Multipurpose White Paper (Xerox 4024), HP Premium Plus Photo Paper (HPPP) Epson Premium Glossy Photopaper ("SEC PM") and Canon PR101 Photopaper (PR101) at 70% depth.

Print Evaluation

The prints were tested for ozone fastness by exposure to 1 ppm ozone at 40° C., 50% relative humidity, for 24 hrs in a Hampden 903 Ozone cabinet. Fastness of the printed ink to ozone can be judged by the difference in the optical density before and after exposure to ozone.

Light-fastness of the printed image was assessed by fading the printed image in an Atlas Ci5000 Weatherometer for 100 hours and then measuring the change in the optical density.

Optical density measurements are performed using a Gretag spectrolino spectrophotometer set to the following parameters:

| Measuring Geometry | 0°/45° |
|---|---|
| Spectral Range | 380-730 nm |
| Spectral Interval | 10 nm |
| Illuminant | D65 |
| Observer | 2° (CIE 1931) |
| Density | Ansi A |
| External Filler | None |

Light and Ozone fastness were assessed by the percentage change in the optical density of the print, where a lower figure indicates higher fastness, and the degree of fade. The degree of fade is expressed as ΔE and a lower figure indicates higher light fastness. ΔE is defined as the overall change in the CIE colour co-ordinates L, a, b of the print and is expressed by the equation $\Delta E = (\Delta L^2 + \Delta a^2 + \Delta b^2)^{0.5}$.

Results

Light Fastness

TABLE 1

|  | % OD Loss Xerox 4024 | % OD Loss HPPP | % OD Loss SEC PM |
|---|---|---|---|
| Ink 1 | 8% | 19% | 9% |
| Ink 2 | 6% | 19% | 5% |
| Ink 3 | 9% | 20% | 8% |
| Comparative Ink 1 | 26% | 35% | 14% |
| Comparative Ink 2 | 16% | 46% | 32% |

Ozone Fastness

TABLE 2

| Optical Density | | |
|---|---|---|
|  | % OD Loss PR101 | % OD Loss SEC PM |
| Ink 1 | 13% | 6% |
| Ink 2 | 13% | 7% |
| Ink 3 | 14% | 7% |

TABLE 2-continued

| Optical Density | | |
|---|---|---|
|  | % OD Loss PR101 | % OD Loss SEC PM |
| Comparative Ink 1 | 39% | 32% |
| Comparative Ink 2 | 38% | 36% |

TABLE 2

| Degree of Fade | | |
|---|---|---|
|  | ΔE PR101 | ΔE SEC PM |
| Ink 1 | 4 | 1 |
| Ink 2 | 4 | 2 |
| Ink 3 | 4 | 1 |
| Comparative Ink 1 | 21 | 10 |
| Comparative Ink 2 | 18 | 14 |

Clearly dyes according to the present invention display a superior ozone and light fastness compared to two of the market leading cyan dyes currently used in ink-jet printing.

Further Inks

The inks described in Tables A and B may be prepared wherein the Compound described in the first column is the Compound made in the above Example of the same number. Numbers quoted in the second column onwards refer to the number of parts of the relevant ingredient and all parts are by weight. The inks may be applied to paper by thermal or piezo ink-jet printing.

The following abbreviations are used in Tables A and B:

PG=propylene glycol

DEG=diethylene glycol

NMP=N-methylpyrollidone

DMK=dimethylketone

IPA=isopropanol

MeOH=methanol

2P=2-pyrollidone

MIBK=methylisobutyl ketone

P12=propane-1,2-diol

BDL=butane-2,3-diol

CET=cetyl ammonium bromide

PHO=$Na_2HPO_4$

TBT=tertiary butanol

TDG=thiodiglycol and

NaOH=sodium hydroxide

TABLE A

| Compound | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 |  | 6 | 4 |  |  |  |  | 5 |  |
| 2 | 3.0 | 90 |  | 5 | 5 |  | 0.2 |  |  |  |  |  |
| 3 | 10.0 | 85 | 3 |  | 3 | 3 |  |  |  | 5 | 1 |  |
| 3 | 2.1 | 91 |  | 8 |  |  |  |  |  |  |  | 1 |
| 2 | 3.1 | 86 | 5 |  |  |  |  | 0.2 | 4 |  |  | 5 |
| 1 | 1.1 | 81 |  |  | 9 |  | 0.5 | 0.5 |  |  | 9 |  |
| 1 | 2.5 | 60 | 4 | 15 | 3 | 3 |  |  | 6 | 10 | 5 | 4 |
| 1 | 5 | 65 |  | 20 |  |  |  |  | 10 |  |  |  |
| 2 | 2.4 | 75 | 5 | 4 |  | 5 |  |  |  | 6 |  | 5 |
| 2 | 4.1 | 80 | 3 | 5 | 2 | 10 |  | 0.3 |  |  |  |  |
| 3 | 3.2 | 65 |  | 5 | 4 | 6 |  |  | 5 | 4 | 6 | 5 |
| 3 | 5.1 | 96 |  |  |  |  |  |  |  | 4 |  |  |
| 3 | 10.8 | 90 | 5 |  |  |  |  |  | 5 |  |  |  |
| 2 | 10.0 | 80 | 2 | 6 | 2 | 5 |  |  | 1 |  | 4 |  |
| 1 | 1.8 | 80 |  | 5 |  |  |  |  |  | 15 |  |  |
| 1 | 2.6 | 84 |  |  | 11 |  |  |  |  | 5 |  |  |
| 2 | 3.3 | 80 | 2 |  |  | 10 |  |  |  | 2 |  | 6 |
| 3 | 12.0 | 90 |  |  | 7 | 0.3 |  |  | 3 |  |  |  |
| 1 | 5.4 | 69 | 2 | 20 | 2 | 1 |  |  |  |  | 3 | 3 |
| 3 | 6.0 | 91 |  |  | 4 |  |  |  |  | 5 |  |  |

TABLE B

| Compound | Dye Content | Water | PG | DEG | NMP | CET | TBT | TDG | BDL | PHO | 2P | P12 |
|---|---|---|---|---|---|---|---|---|---|---|---|---|
| 1 | 3.0 | 80 | 15 |  |  | 0.2 |  |  |  | 5 |  |  |
| 2 | 9.0 | 90 |  | 5 |  |  |  |  |  | 1.2 |  | 5 |
| 3 | 1.5 | 85 | 5 | 5 |  | 0.15 | 5.0 | 0.2 |  |  |  |  |
| 3 | 2.5 | 90 |  |  | 6 | 4 |  |  |  | 0.12 |  |  |
| 2 | 3.1 | 82 | 4 | 8 |  | 0.3 |  |  |  |  |  | 6 |
| 1 | 0.9 | 85 |  | 10 |  |  |  |  | 5 | 0.2 |  |  |
| 1 | 8.0 | 90 |  |  | 5 | 5 |  | 0.3 |  |  |  |  |
| 1 | 4.0 | 70 |  | 10 | 4 |  |  |  | 1 |  | 4 | 11 |
| 2 | 2.2 | 75 | 4 | 10 | 3 |  |  |  | 2 |  | 6 |  |
| 2 | 10.0 | 91 |  |  | 6 |  |  |  |  |  | 3 |  |
| 3 | 9.0 | 76 |  | 9 | 7 |  | 3.0 |  |  | 0.95 | 5 |  |
| 3 | 5.0 | 78 | 5 | 11 |  |  |  |  |  |  | 6 |  |
| 3 | 5.4 | 86 |  |  | 7 |  |  |  |  |  | 7 |  |
| 2 | 2.1 | 70 | 5 | 5 | 5 | 0.1 | 0.2 | 0.1 | 5 | 0.1 | 5 |  |
| 1 | 2.0 | 90 |  |  | 10 |  |  |  |  |  |  |  |
| 1 | 2 | 88 |  |  |  |  |  | 10 |  |  |  |  |
| 2 | 5 | 78 |  |  | 5 |  |  | 12 |  |  | 5 |  |
| 3 | 8 | 70 | 2 |  | 8 |  |  | 15 |  |  | 5 |  |
| 1 | 10 | 80 |  |  |  |  |  | 8 |  | 12 |  |  |
| 3 | 10 | 80 |  |  | 10 |  |  |  |  |  |  |  |

The invention claimed is:

1. A compound of Formula (1) in the free acid or salt form:

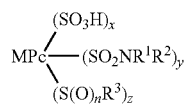

Formula (1)

wherein:

M is 2H, Si, a metal, an oxymetal group, a hydroxymetal group or a halometal group;

Pc represents a phthalocyanine nucleus of formula;

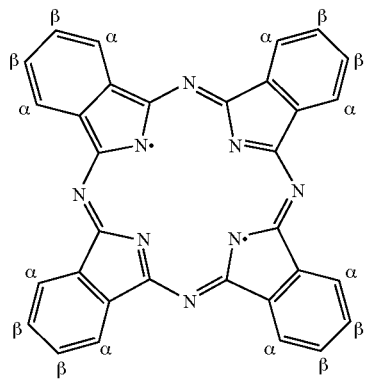

each $R^1$ and $R^2$ independently is H, optionally substituted alkyl or optionally substituted aryl;

each $R^3$ independently is optionally substituted alkyl or optionally substituted aryl;

each n independently is 1 or 2;

x is 0.5 to 2;

y is 0.1 to 2.5;

z is 0.1 to 2.5; and the sum (x+y+z) is 2.2 to 4, and wherein the substituents represented by $-(SO_3H)_x-$, $-(SO_2NR^1R^2)_y$ and $-(S(O)_nR^3)_z$ are each attached to the phthalocyanine ring through β-positions.

2. A compound according to claim 1 wherein y is 0.5 to 2.

3. A compound according to claim 1 wherein z is 0.5 to 2.

4. A compound according to claim 1 wherein x is 0.6 to 1.4, y is 0.6 to 1.5 and z is 0.6 to 1.5.

5. A compound according to claim 1 wherein the sum of (x+y+z) is 4.

6. A composition comprising a compound according to claim 1 and a liquid medium.

7. A composition according to claim 6 that is an ink comprising a mixture of water and organic solvent suitable for use in an ink jet printer ink.

8. A process for forming an image on a substrate comprising applying an ink according to claim 7 thereto by means of an ink jet printer.

9. A printed substrate, printed with a compound according to claim 1.

10. An ink jet printer cartridge comprising a chamber and an ink according to claim 7.

11. A printed substrate printed with a composition according to claim 6.

12. A printed substrate printed with an ink according to claim 7.

13. A printed substrate printed by a process according to claim 8.

* * * * *